United States Patent
Dreier

(10) Patent No.: US 8,601,310 B2
(45) Date of Patent: Dec. 3, 2013

(54) PARTIAL MEMORY MIRRORING AND ERROR CONTAINMENT

(75) Inventor: Roland Dreier, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 12/807,034

(22) Filed: Aug. 26, 2010

(65) Prior Publication Data

US 2012/0054543 A1    Mar. 1, 2012

(51) Int. Cl.
G06F 11/07    (2006.01)

(52) U.S. Cl.
USPC ........... 714/6.12; 714/6.1; 714/6.11; 714/6.2; 714/6.23

(58) Field of Classification Search
USPC ........................ 714/6, 12, 6.2, 6.23
See application file for complete search history.

(56) References Cited

U.S. PATENT DOCUMENTS

| | | | |
|---|---|---|---|
| 2006/0187739 A1* | 8/2006 | Borkenhagen et al. | 365/230.05 |
| 2007/0022122 A1* | 1/2007 | Bahar et al. | 707/10 |
| 2007/0233455 A1* | 10/2007 | Zimmer et al. | 703/27 |
| 2009/0172323 A1* | 7/2009 | Swanson et al. | 711/162 |
| 2009/0216985 A1* | 8/2009 | O'Connor et al. | 711/170 |
| 2009/0217024 A1* | 8/2009 | Childs et al. | 713/2 |
| 2009/0327638 A1* | 12/2009 | Buch | 711/166 |
| 2010/0064092 A1* | 3/2010 | Hess et al. | 711/103 |
| 2010/0080124 A1* | 4/2010 | Angiolini et al. | 370/235 |
| 2010/0082766 A1 | 4/2010 | Dreier | |
| 2010/0115330 A1* | 5/2010 | Khatri et al. | 714/6 |
| 2010/0205392 A1* | 8/2010 | Schnapp et al. | 711/162 |
| 2011/0010496 A1* | 1/2011 | Kirstenpfad et al. | 711/114 |
| 2011/0154103 A1* | 6/2011 | Bulusu et al. | 714/6.23 |
| 2011/0173385 A1* | 7/2011 | Swanson et al. | 711/105 |
| 2012/0017038 A1* | 1/2012 | Gorobets et al. | 711/103 |

\* cited by examiner

Primary Examiner — Chae Ko
(74) Attorney, Agent, or Firm — Cindy Kaplan

(57) ABSTRACT

In one embodiment, an apparatus includes memory comprising a first portion in which data contained therein is mirrored and a second portion wherein data contained therein is not mirrored, a memory allocator for allocating the first portion of the memory to critical data and allocating the second portion of the memory to non-critical data, and a processor for mirroring the critical data and receiving an indication of a memory error. If the memory error occurs in the first portion of the memory, a mirrored copy of the critical data is used. If the memory error occurs in the second portion of the memory, the memory error is contained so that the apparatus can continue to operate programs using the memory not affected by the memory error.

11 Claims, 3 Drawing Sheets

PARTIAL MEMORY MIRRORING AND ERROR CONTAINMENT

TECHNICAL FIELD

The present disclosure relates generally to computers, and more particularly, to computer memory.

BACKGROUND

Computer systems running important applications should be resilient against failures due to memory errors. One technique for improving computer system availability is to store two copies of all data so that in the event of a memory error associated with the first copy of data, the system can use the second copy. This results, however, in a reduction of memory capacity by at least a factor of two and increases system costs. The memory capacity requirements of computers, and in particular servers, are increasing rapidly, therefore, conventional systems which significantly reduce memory capacity are not desirable solutions to improve system resiliency.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
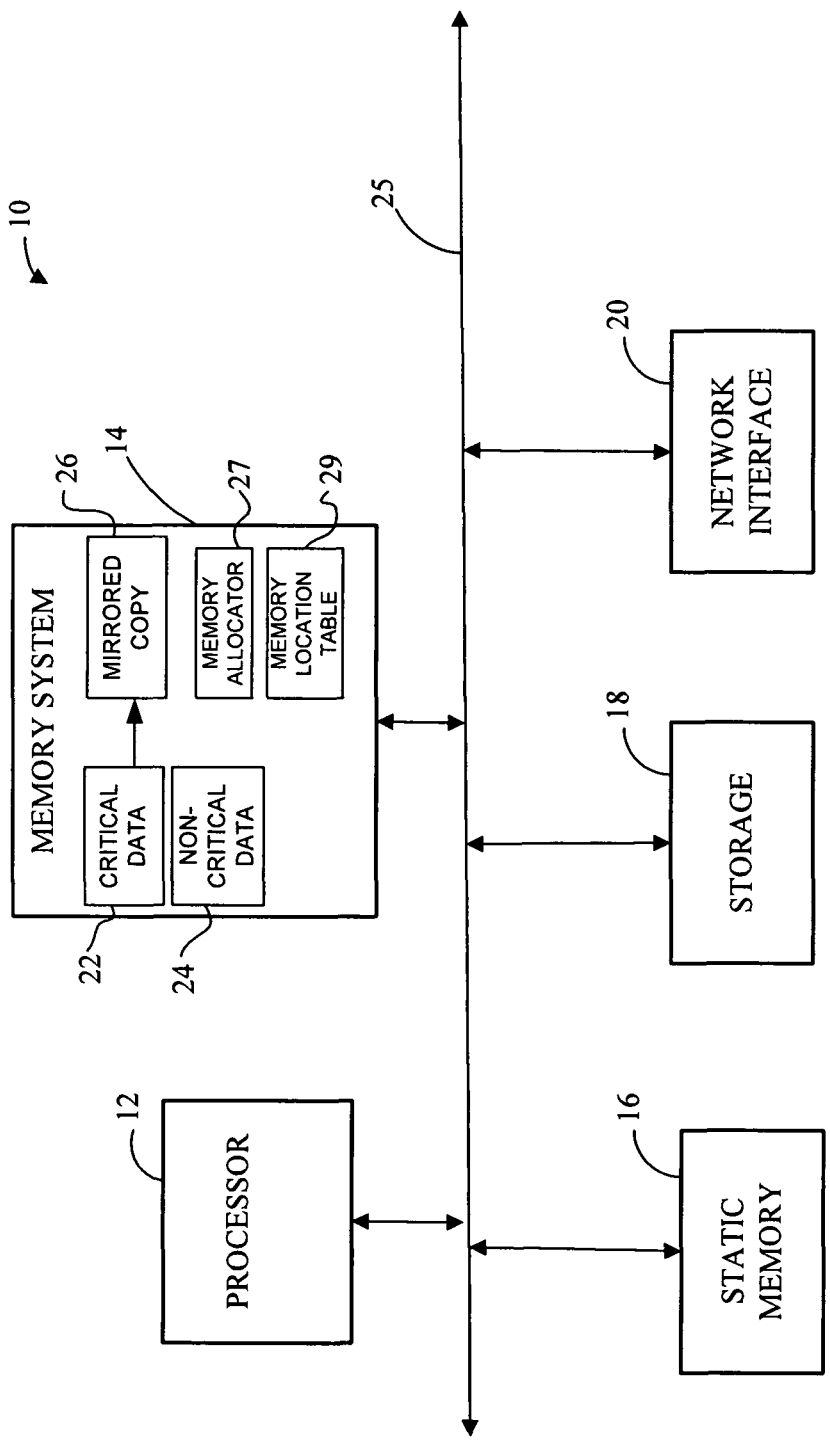
FIG. 1 illustrates an example of a computer system in which embodiments described herein may be implemented.

In one embodiment, a method generally comprises identifying in a computer system, a first portion of memory to be mirrored, wherein a second portion of the memory is not mirrored, storing critical data in the first portion of the memory and creating a mirrored copy of the critical data, storing non-critical data in the second portion of the memory, and detecting a memory error. If the memory error occurs in the first portion of the memory, the mirrored copy of the critical data is used. If the memory error occurs in the second portion of the memory, the memory error is contained so that the computer system continues to operate programs using the memory not affected by the memory error.

In another embodiment, an apparatus generally comprises memory comprising a first portion in which data contained therein is mirrored and a second portion wherein data contained therein is not mirrored, a memory allocator for allocating the first portion of the memory to critical data and allocating the second portion of the memory to non-critical data, and a processor for mirroring the critical data and receiving an indication of a memory error. If the memory error occurs in the first portion of the memory, a mirrored copy of the critical data is used. If the memory error occurs in the second portion of the memory, the memory error is contained so that the apparatus can continue to operate programs using the memory not affected by the memory error.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

It is important for computer systems, such as server computer systems, to be resilient against failures due to memory errors. Memory mirroring improves system resiliency by storing two copies of data, each copy a mirrored image of the other. If an error occurs in the mirrored memory, data can be recovered using the stored copy. However, if all of the memory is mirrored, memory capacity is reduced by at least a factor of two. For example, a platform with 512 GB of memory would only have 256 GB of usable memory capacity after enabling memory mirroring for all data.

Another technique that can be used to improve system resiliency is error containment. Error containment may be used to identify an impacted process so that the error can be contained before the error is propagated. If an uncorrectable memory error is reported to the operating system, the operating system may decide to continue running and terminate the process if it is not critical to operation of the computer system. However, if the memory error results in failure of a critical process, the error may still result in system wide failure.

The embodiments described herein utilize error containment in combination with partial memory mirroring to provide improved system resiliency without significantly impacting available memory capacity. As described in detail below, critical data is stored in mirrored memory, while non-critical data is stored in memory that is not mirrored. If an error occurs in the non-mirrored memory, error containment is used to prevent overall system failure. If an error occurs in the mirrored memory, a mirrored copy of the critical data can be used to allow the system to recover. The embodiments may be implemented, for example, in server platforms, such as those used for business critical applications, server appliances, or any other computer system or network device.

Referring now to the drawings, and first to FIG. 1, an example of a computer system 10 in which embodiments described herein may be implemented is shown. The computer system 10 includes a processor (e.g., central processing unit (CPU) or multiple CPUs) 12, memory system 14, static memory 16, storage 18, and network interface 20. The memory system 14 includes volatile memory for storing data classified as either critical data 22 or non-critical data 24. As described in detail below, the memory system 14 uses partial memory mirroring to improve system availability by storing a copy 26 of the critical data. Each copy of data 22, 26 is a mirrored image of the other, so that in the event of a failure, the data can be recovered by using the mirrored copy. The memory system 14 further includes a memory allocator 27 for allocating mirrored and non-mirrored memory, and a memory location table 29 for identifying the mirrored and non-mirrored memory.

The static or non-volatile memory 16 may store BIOS (Basic Input Output System) to act as an interface between system hardware and system software and initialize system hardware upon boot up of the computer system 10. The storage 18 may include fixed storage (e.g., hard drive) and removable storage (e.g., CD-ROM drive). Computer storage media may also include DVDs or other optical storage, magnetic cassette, tape, or disk storage, or any other medium that can be used to store information which can be accessed by the computer. Memory 14, 16 and storage 18 may be utilized to store and retrieve instructions and data structures (e.g., software). Logic may be encoded in one or more tangible media for execution by the processor 12.

The computer system 10 may also include input devices (e.g., keyboard, mouse tracking device, touch screen, or other device for interacting with a user interface) and output devices (e.g., display, speakers) (not shown).

The system bus architecture of computer system 10 is represented by arrows 25 in FIG. 1. However, these arrows are only illustrative of one possible interconnection scheme serving to link the subsystems. For example, a local bus could be utilized to connect the processor 12 to the memory system 14. It is to be understood that the computer system shown in FIG. 1 is only one example of a computer system suitable for use with the embodiments and that other computer architectures having different configurations of subsystems may also be utilized without departing from the scope of the embodiments.

As previously discussed, only data that is determined to be critical is mirrored, to reduce the amount of memory required to store mirrored data. The critical data 22 may include, for example, kernel binary, kernel code segment, kernel data structures (page tables, etc.), hypervisor code in a virtual environment, or any data in which an error would result in system wide impact (e.g., computer system crashing). The non-critical data 24 may include, for example, user applications, virtual machines, or any data in which an error does not result in the entire system failing. The decision as to whether data is critical or non-critical is preferably made by the operating system during memory allocation.

Figure 2:
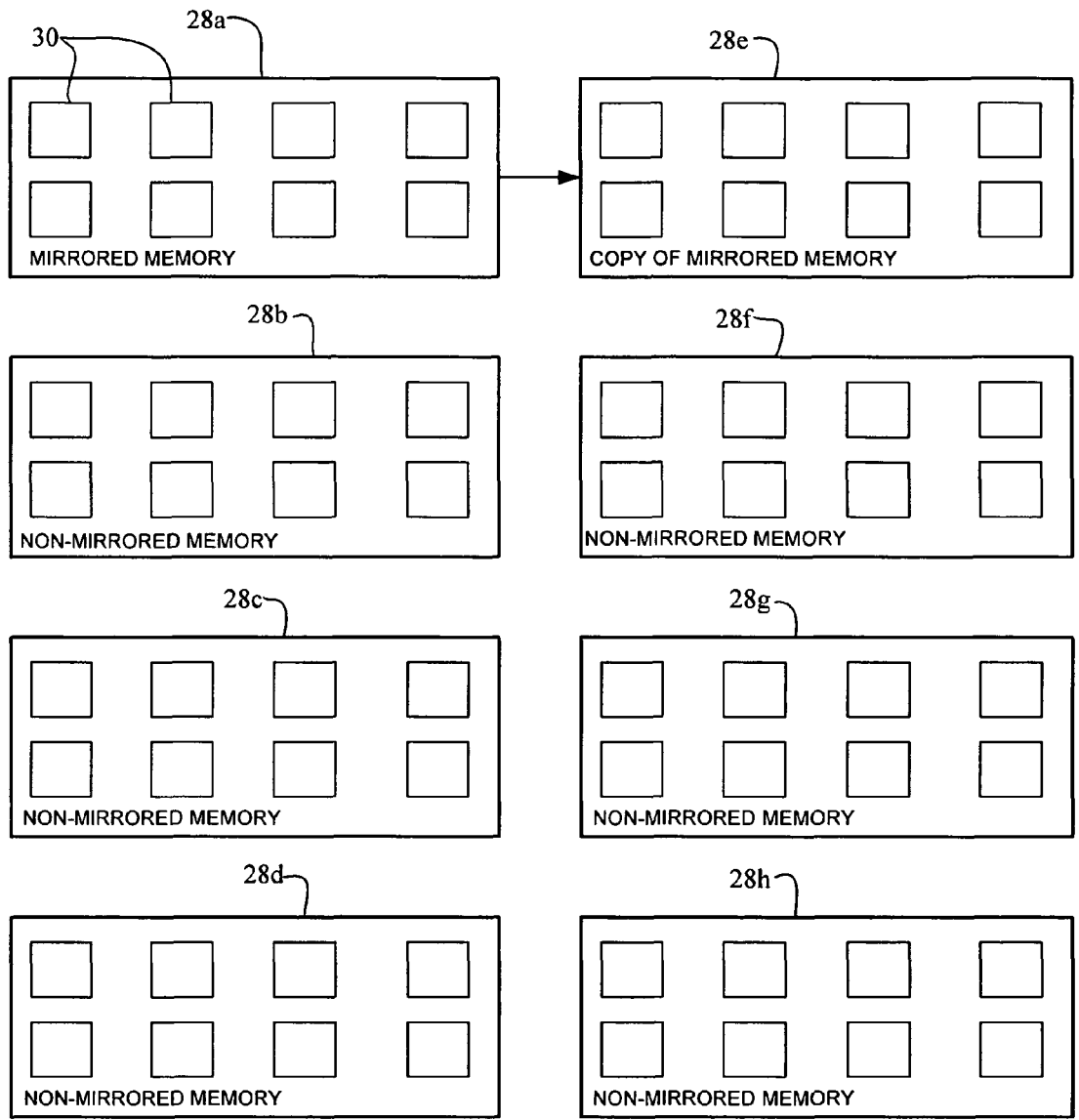
FIG. 2 is a block diagram illustrating memory for use in the computer system of FIG. 1, in accordance with one embodiment.

The memory system 14 includes one or more memory controllers (e.g., memory allocator 27) coupled to the processor 12 and configured to control multiple memory modules 30 (FIGS. 1 and 2). The processor 12 may access instructions that are stored within the memory modules 30 and process the instructions in connection with operation of the computer system 10. The memory modules 30 may store instructions or any other software code, records, or data accessed by the processor, or by applications or operating systems running on the computer system 10. The memory controller may receive requests from the processor 12 to access the memory modules 30. Communications between the processor 12 and the memory controller may be made using a communication protocol, as is well known by those skilled in the art.

In one embodiment, each memory module 30 is a dual in-line memory module (DIMM) configured to host multiple memory devices (e.g., Random Access Memory (RAM) devices). Each DIMM includes one or more sets of memory cells referred to as ranks. Each rank may include one or more banks of memory cells and each bank of memory cells includes an array of rows and columns, the intersection of which is the location and address of a memory cell. The DIMMs may be single rank, dual rank, or quad rank. It is to be understood that the DIMMs and RAMs described herein are examples and that other types of memory may be used without departing from the scope of the embodiments.

FIG. 2 illustrates memory for use in the memory system 14 of FIG. 1, in accordance with one embodiment. In the example shown in FIG. 2, memory includes eight groups (28a, 28b, 28c, 28d, 28e, 28f, 28g, 28h) each comprising eights DIMMs 30. The DIMMs may include a series of random access memory integrated circuits. Memory for critical data 22 is allocated in group 28a designated to be mirrored.

The memory controller retrieves the stored data from memory group 28a and stores a duplicate copy in group 28e. In the example of FIG. 2, only one group of DIMMs 28a is copied into a group of DIMMs 28e reserved for receiving a copy of the mirrored memory. Therefore, only $\frac{1}{8}^{th}$ of the memory is mirrored. The other six groups of DIMMs (28b, 28c, 28d, 28f, 28g, 28h) contain non-mirrored memory. It is to be understood that this is only an example and that any portion of memory may be mirrored. The portion of memory that is mirrored may be a fixed percentage or may be user configured.

The memory of FIG. 2 may include, for example, 64, 4 GB DIMMs, which provide 256 GB of memory. If all of the data were mirrored, the mirrored memory would consume 128 GB of memory. In the above example, only one group of DIMMs is mirrored, resulting in only 32 GB of memory used for mirrored data. The usable memory is therefore only reduced to 224 GB. This provides a significant improvement over the case in which all data is mirrored.

In one embodiment, the mirrored memory 28a is placed at the bottom (lowest address) of a memory map and non-uniform memory access (NUMA) interleaving is disabled.

In a Linux implementation, the mirrored memory may be located in a 'non-movable zone', while the non-mirrored memory is located in a 'movable zone'.

The groups of DIMMs 28a-28h may be associated with different CPUs. For example, a computer system may include four CPUs, each CPU associated with two groups of DIMMs. In this case, the memory which is mirrored and the memory containing the mirrored copy (28a, 28e) may be associated with the same CPU.

In one embodiment, the BIOS reports the mirrored portion of memory (address of memory reserved for mirrored memory) to the operating system. For example, the platform may export memory information to the operating system via an ACPI (Advanced Configuration and Power Interface) table describing which memory is mirrored and which memory is not mirrored. The operating system uses this information to locate critical data in mirrored memory 28a and non-critical data in non-mirrored memory 28b, 28c, 28d, 28f, 28g, 28h.

It is to be understood that the memory system shown in FIG. 2 and described above, is only one example and that any arrangement or number of memory modules may be used and any portion (e.g., number of groups, percentage) of memory may be mirrored.

During system operation, memory errors may occur. Error detection may be based on any type of detection mechanism. Without error containment, the errors may be propagated during program execution, causing an operating system to initiate a shutdown of the entire computer system. Uncorrectable errors that are reported to the operating system will typically involve the non-mirrored memory, since errors in the mirrored memory can be handled by retrieving the mirrored copy of data. Error containment is used to prevent system failure if a memory error occurs in non-mirrored memory.

If an uncorrectable memory error is detected, the processor raises a 'machine check exception', reports the location in memory in which the error was encountered to the operating system, and allows for the possibility of continuing operation after the operating system handles the exception. If the error was detected in memory containing cached information, the kernel can discard the cache page and reread or regenerate it when required. If the error was detected in memory being used by a non-kernel process, the kernel can deliver a signal to the processor to terminate the process. The operating system can terminate the single application or virtual machine impacted by the memory error and the overall system will continue to operate and run other processes.

If an error occurs in mirrored memory, the mirrored copy of the data can be retrieved and used without impacting system operation.

The error may be reported to the operating system via standard error reporting mechanisms so that an operator can replace the failed memory if the platform supports online memory replacement, or schedule an orderly shutdown if the platform needs to be taken offline to service memory modules.

The operating system (or hypervisor) preferably maintains a reverse mapping table to map a physical address back to the contexts and virtual addresses corresponding to the physical address associated with an error.

Figure 3:
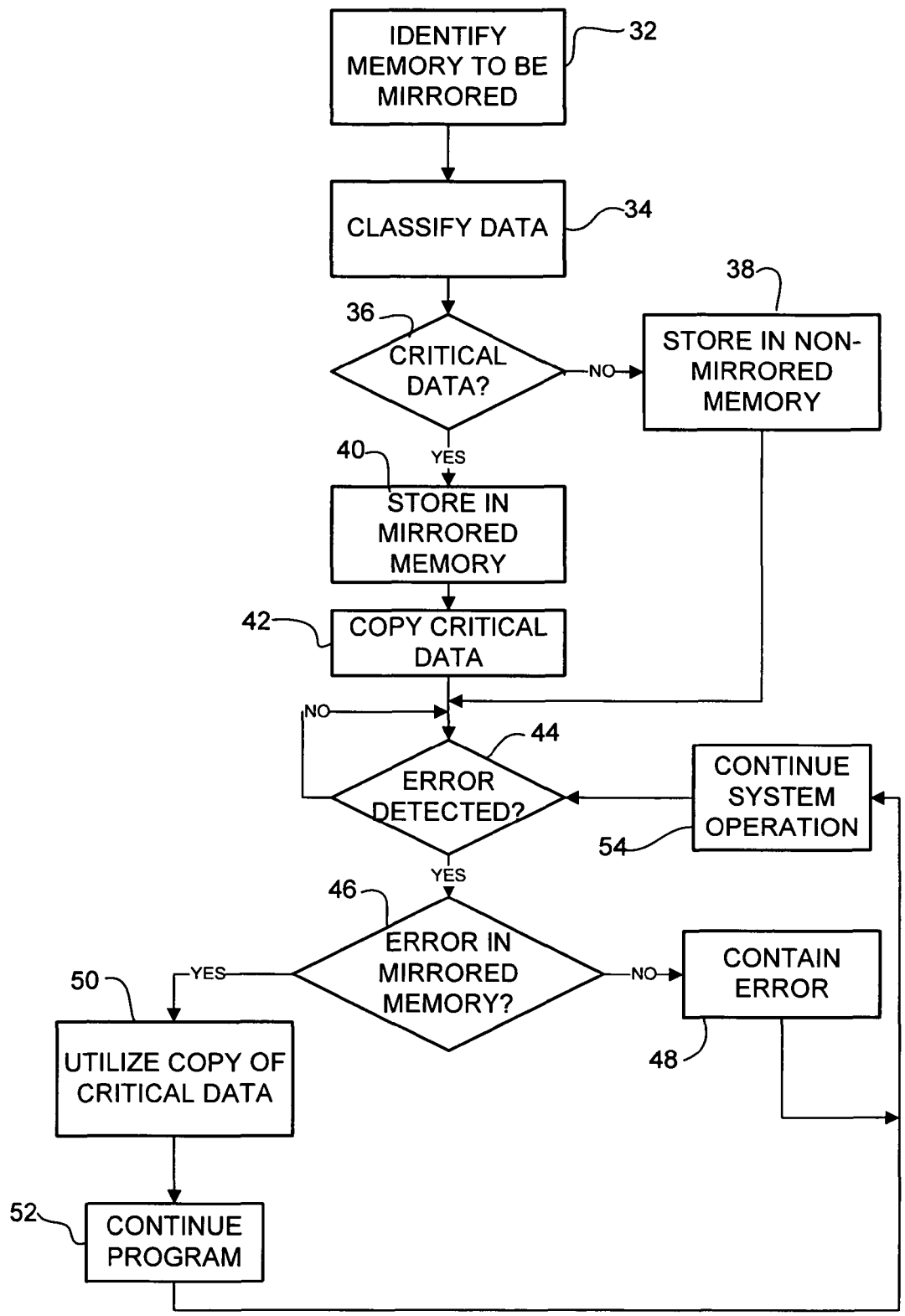
FIG. 3 is a flowchart illustrating a process for partial memory mirroring and error containment in the computer system of FIG. 1, in accordance with one embodiment.

FIG. 3 is a flowchart illustrating a process for partial memory mirroring and error containment, in accordance with one embodiment. At step 32, the memory which is to be mirrored (e.g., first portion of memory) is identified. The first portion of the memory (group 28a in FIG. 2) is reserved for storing critical data. The location (address) in memory of the mirrored memory 28a is provided to the operating system. The mirrored portion 28a of memory may be identified in an ACPI table or other data structure passed from BIOS to the operating system, for example. Data to be stored in memory is classified as critical data 22 or non-critical data 24 (step 34) (FIGS. 1 and 3). As described above, the operating system may classify the data and refer to the ACPI table to make a memory allocation decision. Non-critical data 24 is stored in a second portion (non-mirrored portion) of memory (groups 28b, 28c, 28d, 28f, 28g, and 28h of FIG. 2) (step 38). Critical data is stored in the first portion of memory 28a and a mirrored copy is stored in the reserved section of memory 28e (steps 40 and 42).

An error is detected at step 44. If the memory error occurs in the non-mirrored portion of the memory, the error is contained (steps 46 and 48). The error may be contained, for example, by terminating a program (e.g., process, thread, application, virtual machine executing program) associated with the memory error. If the memory error occurs in the mirrored memory, the mirrored copy 26 of the critical data is used (step 50) and the program continues (step 52). The mirrored copy is read from and written to in place of the data associated with the error. The error may be reported so that the memory in which the error occurred can be repaired or replaced. System operation continues at step 54.

It is to be understood that the process illustrated in FIG. 3 is only an example and that steps may be modified, removed, or added without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    identifying in a computer system, a first portion of memory to be mirrored, wherein a second portion of the memory is not mirrored;
    determining if data is critical or non-critical during memory allocation;
    storing critical data in said first portion of the memory and creating a mirrored copy of the critical data;
    storing non-critical data in said second portion of the memory, wherein storing the critical and non-critical data comprises making allocation decisions based on information received from a basic input output system;
    detecting a memory error;
    if said memory error occurs in said first portion of the memory, utilizing the mirrored copy of the critical data; and
    if said memory error occurs in said second portion of the memory, containing said memory error so that the computer system continues to operate programs using the memory not affected by said memory error, wherein containing said memory error comprises identifying a process impacted by an uncorrectable error and terminating the process to prevent the error from propagating or regenerating cached information to correct said memory error;
    wherein identifying a first portion of the memory to be mirrored comprises identifying by an operating system during memory allocation based on information received from the basic input output system operating as an interface between system hardware and system software and to initialize the system hardware upon boot up of the computer system.

2. The method of claim 1 wherein said mirrored memory comprises a first group of memory modules and wherein the mirrored copy of the critical data is stored in a second group of memory modules.

3. The method of claim 1 wherein identifying said first portion of memory to be mirrored comprises passing memory location information to the operating system.

4. The method of claim 3 wherein said memory location information is stored in an Advanced Configuration and Power Interface (ACPI) table.

5. An apparatus comprising:
    memory comprising a first portion in which data contained therein is mirrored and a second portion wherein data contained therein is not mirrored;
    a memory allocator for allocating said first portion of the memory to critical data and allocating said second portion of the memory to non-critical data;
    a memory location table for use in identifying the mirrored and non-mirrored memory; and
    a processor for determining if data is critical or non-critical during memory allocation, mirroring the critical data, receiving an indication of a memory error, utilizing a mirrored copy of the critical data if said memory error occurs in said first portion of the memory, and containing said memory error so that the apparatus continues to run programs using the memory not affected by said memory error, if said memory error occurs in said second portion of the memory, wherein containing said memory error comprises identifying a process impacted by an uncorrectable error and terminating the process to prevent the error from propagating or regenerating cached information to correct said memory error;
    wherein identifying a first portion of the memory to be mirrored comprises identifying by an operating system during memory allocation based on information received from a basic input output system operating as an interface between system hardware and system software and to initialize the system hardware upon boot up of the computer system.

6. The apparatus of claim 5 wherein said mirrored memory comprises a first group of memory modules and wherein the mirrored copy of the critical data is stored in a second group of memory modules.

7. The apparatus of claim 5 wherein memory location information identifying said first portion of memory is stored in an Advanced Configuration and Power Interface (ACPI) table.

8. Logic encoded on a non-transitory machine-readable storage medium for execution and when executed operable to:
- identify a first portion of memory to be mirrored, wherein a second portion of memory is not mirrored;
- determine if data is critical or non-critical during memory allocation;
- allocate memory for critical data in said first portion of the memory and allocating memory for non-critical data in said second portion of the memory based on information received from a basic input output system;
- utilize a mirrored copy of the critical data if a memory error occurs in said first portion of the memory; and
- contain said memory error so that the apparatus continues to run programs using the memory not affected by said memory error, if said memory error occurs in said second portion of the memory, wherein said memory error is contained by identifying a process impacted by an uncorrectable error and terminating the process to prevent the error from propagating or regenerating cached information to correct said memory error;
- wherein identifying a first portion of the memory to be mirrored comprises identifying by an operating system during memory allocation based on information received from a basic input output system operating as an interface between system hardware and system software and to initialize the system hardware upon boot up of the computer system.

9. The logic of claim 8 wherein said mirrored memory comprises a first group of memory modules and wherein the mirrored copy of the critical data is stored in a second group of memory modules.

10. The logic of claim 8 wherein terminating the identified program comprises terminating a virtual machine that executes the program.

11. A system comprising:
- a network interface;
- memory comprising a first portion for storing critical data and a second portion for storing non-critical data; and
- a controller for mirroring said critical data contained within said first portion of the memory so that a mirrored copy of said critical data is available for use if an error occurs in said first portion of the memory, wherein data contained within said second portion of the memory is not mirrored;
- wherein the system is configured to contain a memory error in said second portion of the memory so that the system continues to run programs using the memory not affected by said memory error, wherein said memory error is contained by identifying a process impacted by an uncorrectable error and terminating the process to prevent the error from propagating or regenerating cached information to correct said memory error;
- wherein identifying a first portion of the memory to be mirrored comprises identifying critical data by an operating system during memory allocation based on information received from a basic input output system operating as an interface between system hardware and system software and to initialize the system hardware upon boot up of the computer system.

* * * * *